United States Patent [19]
Trythall

[11] 3,941,426
[45] Mar. 2, 1976

[54] APPARATUS FOR HANDLING FLOWABLE MATERIAL

[75] Inventor: William John Courtney Trythall, Morpeth, England

[73] Assignee: Trythall Design and Development Ltd., Fareham, England

[22] Filed: Jan. 17, 1975

[21] Appl. No.: 542,054

[52] U.S. Cl. .................... 302/26; 222/57; 222/193; 302/41; 302/42
[51] Int. Cl.² ........................................ B65G 53/40
[58] Field of Search ............ 302/26, 34, 41, 42, 52, 302/53, 57; 222/57, 193

[56] References Cited
UNITED STATES PATENTS

| | | | |
|---|---|---|---|
| 3,206,078 | 9/1965 | Leimegger | 222/193 |
| 3,858,763 | 1/1975 | Mack | 302/52 |

Primary Examiner—Evon C. Blunk
Assistant Examiner—Jeffrey V. Nase
Attorney, Agent, or Firm—Larson, Taylor & Hinds

[57] ABSTRACT

An Apparatus for handling flowable material, such as sludge or granular or powder materials, a pneumatically operated annular closure member located in an annular casing is retracted to allow the material to flow into a space at the bottom of the apparatus and is extended to close this space and entrap the material within it. Air pressure is applied to this enclosed space to transport the material from that space through an outlet tube. Opening and closing of the closure member and the application of air under pressure to the material are controlled pneumatically.

7 Claims, 3 Drawing Figures

APPARATUS FOR HANDLING FLOWABLE MATERIAL

This invention relates to apparatus for handling flowable material.

According to the invention, there is provided an apparatus for handling flowable material comprising a base providing an annular valve seat, a support plate spaced from the base, having inner and outer concentric casings supported thereon, a pneumatically operable annular closure member located in an annular chamber defined between the casings and mounted for movement between a retracted position in which a material inlet provided between said support plate and said base is open and an extended position in which the closure member engages said valve seat to close said inlet, a material outlet tube opening adjacent said base and extending axially away therefrom through the interior of the inner casing, and pneumatic control means for controlling the opening and closing of said inlet by the closure member, and for directing air under pressure to the space enclosed by the closure member, when the closure member is in its extended position to transport material from that space through the outlet tube.

Embodiments of the invention will now be described by way of example only with reference to the accompanying drawings in which.

Figure 1:
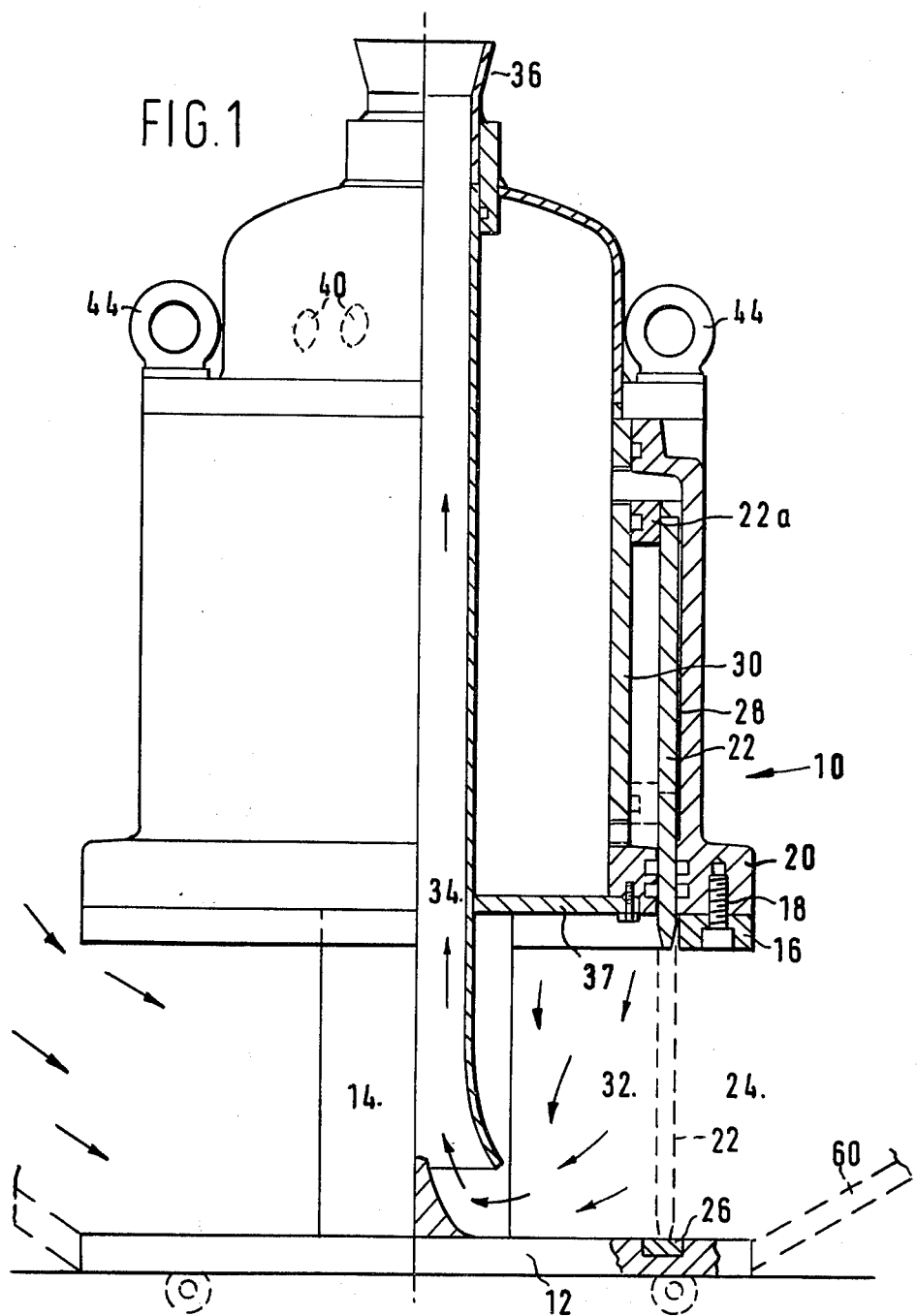
FIG. 1 is a longitudinal section through an apparatus for handling flowable material according to the invention.

Referring to FIG. 1, the device 10 includes a base 12 from which extends a pair of legs 14 attached at their upper ends to a support plate 16; secured as by bolts 18 to plate 16 is an outer annular casing 20 in which is housed a pneumatically operable cylindrical closure member 22 operable to control the passage into the apparatus of material to be handled. Member 22 is movable from a retracted upper limit position (shown in full lines) in which material inlet 24 is fully open, to an extended lower limit position (shown in dotted lines) in which inlet 24 is fully closed and sealed by engagement of member 22 with annular seal or seat 26 provided on base 12. The upper part 22a of member 22 is enlarged to provide a piston which is slidable in an annular cylinder chamber 28 formed between concentric outer and inner casings 20 and 30 respectively. When member 22 is in its closed position, material to be handled is entrapped in space 32 defined within member 22, which chamber is in communication with an axially extending material outlet tube 34 passing through the interior of casings 20 and 30 to an outlet 36 connected to a pipeline (not shown).

In order to transport the entrapped material from space 32 to outlet 36, pneumatic control means (not shown) are provided within inner casing 30 to supply air under pressure to space 32 via an air control valve (not shown) in lower wall 37 of casing 30. The control means is operable to control in the correct sequence the operation, and period of operation of the closure member 22, and the air supply cycle to chamber 32; the control means may be manually or automatically operated.

For manual operation, the device includes two buttons 40 located at the top of casing 30, pressure on one of the buttons causing the member 22 to close slowly and at very low force, and pressure on the other button causing full air pressure to be applied to member 22 to seal chamber 32 and to initiate the timed blowing cycle at the end of which the member 22 rises automatically and the two buttons reset automatically in readiness for the next cycle.

In one modification of the above described embodiment the interior of casing 30 acts as a reservoir which when the air control valve is opened directs air under pressure to space 32.

Figure 2:
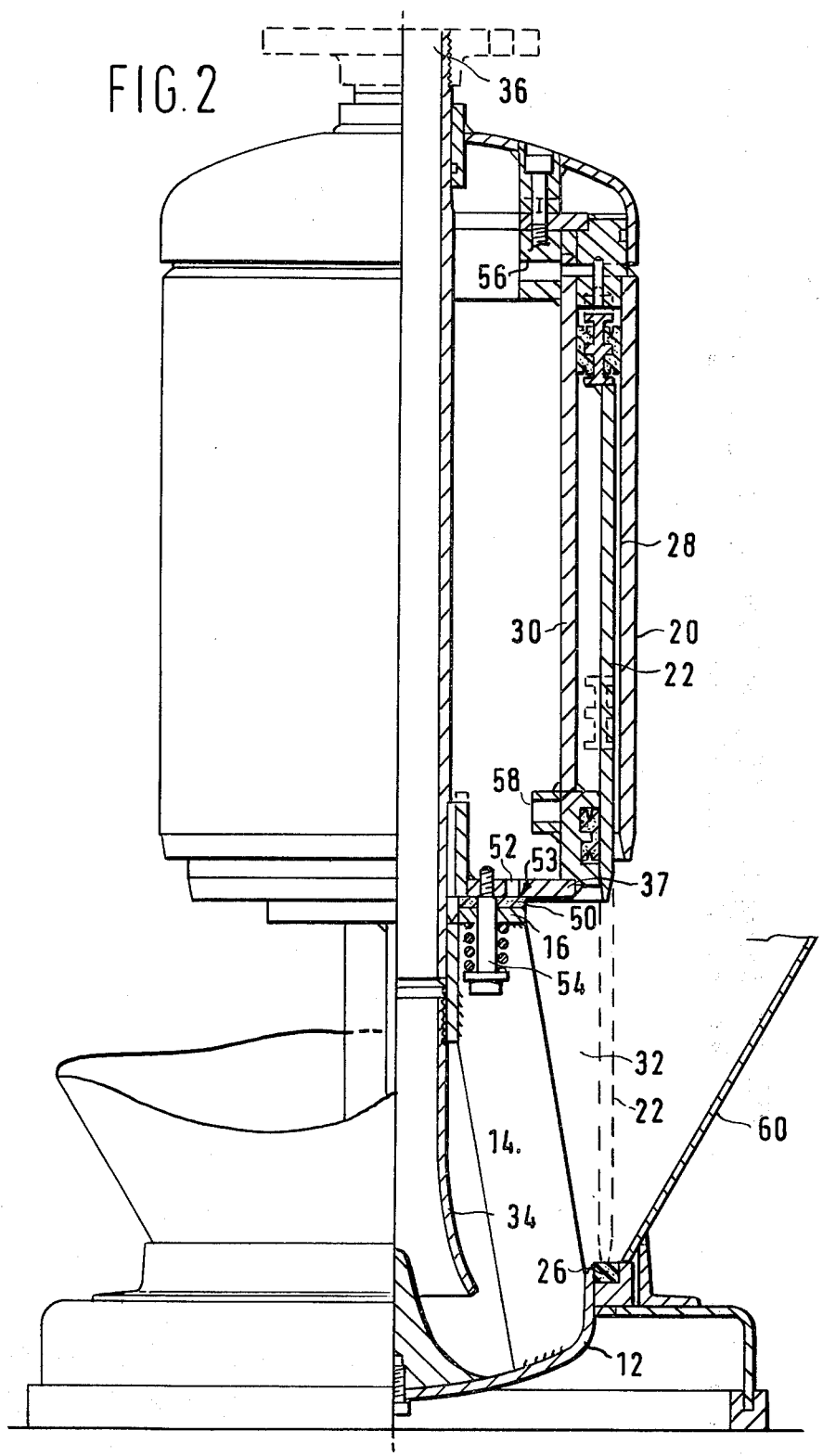
FIG. 2 is a longitudinal section through another embodiment of the apparatus according to the invention and, FIG. 3 is a longitudinal section through a further embodiment of the apparatus according to the invention.

The embodiment of the apparatus for handling flowable material shown in FIG. 2 is similar to that described in connection with FIG. 1 and therefore only the differences will be described in detail; common parts are given the same reference numerals. In this embodiment, the assembly consisting of casings 20 and 30 and closure member 22 is mounted on support plate 16 and tube 34 for limited relative movement, the tube being rigidly secured to, or integral with, the support plate. Disposed between plate 16 and the lower wall 37 of casing 30 is a disc 50 of resilient material, and provided in the lower wall are a plurality of through openings 52 which together with disc 50 provide an air control valve 53. During manufacture of the apparatus, the above mentioned assembly is dropped over tube 34 on to disc 50 and is secured in position by a plurality of spring and bolt units 54 (one only shown).

The closing force of the air pressure on the closure member 22 and the restraining force of the units 54 are such that when the closure member engages valve seat 26, the force of the units is overcome to raise the casing assembly say ⅛ from disc 50 whereby to open openings 52 to permit air to pass from the reservoir within casing 30 to space 32 to "blow" or transport material through tube 34.

Figure 3:
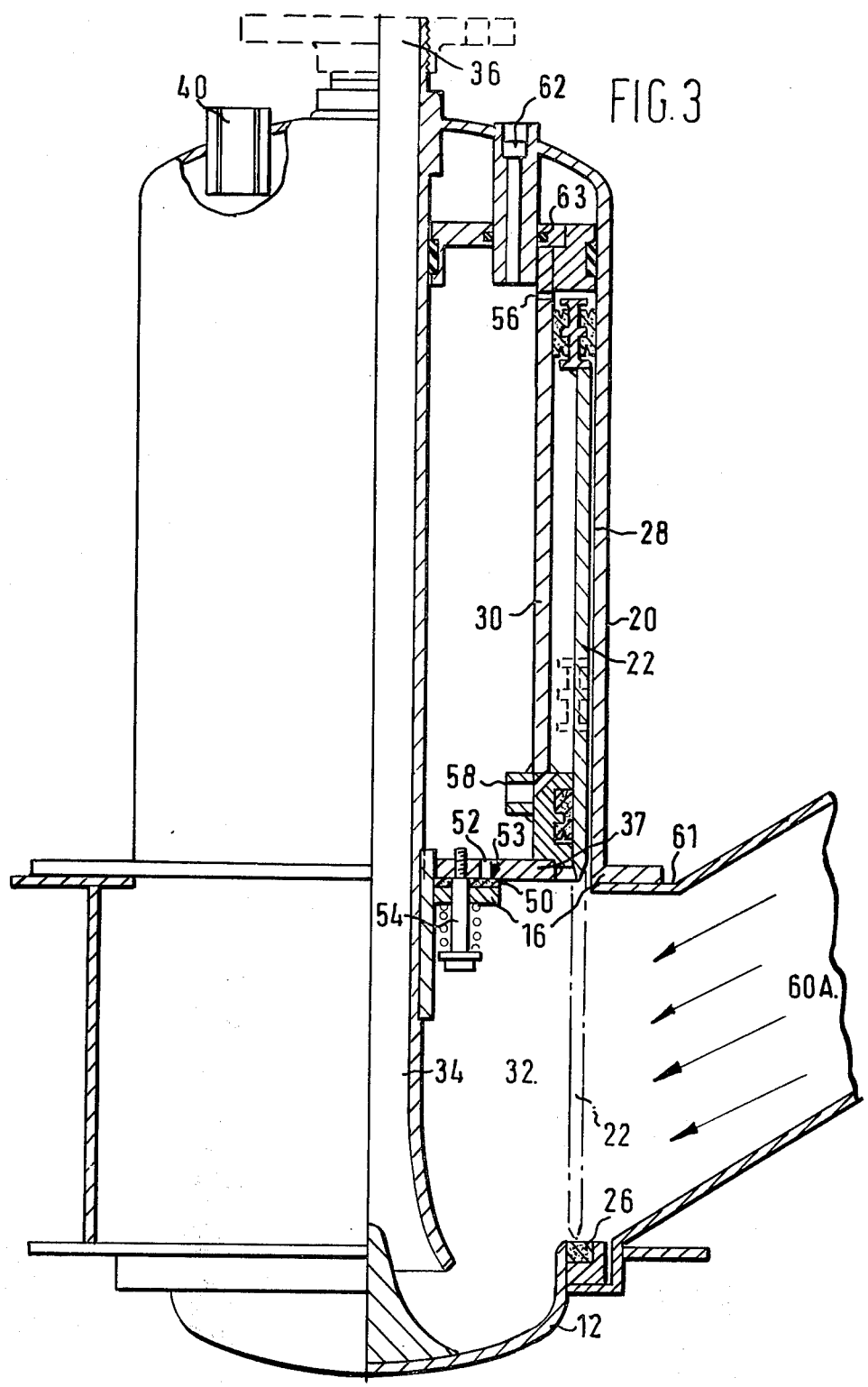

The embodiment of the apparatus for handling flowable material shown in FIG. 3 is again similar to that described in connection with FIG. 1 or FIG. 2 and will therefore only have the differences described in detail; common parts are given the same reference numerals and though shown as a variant of FIG. 2 might equally have been shown as a variant of FIG. 1. In this embodiment, the assembly, consisting of casings 20 and 30 and closure member 22, is mounted on a flanged outlet 61 of a feeder pipeline 60A. Diametrically opposite the flanged outlet 61 is a base 12 of similar shape to that shown in FIG. 2. The outer casing 20 and tube 34 are integral with one another and the inner casing 30 is raised against the spring pressure when the closure member 22 engages valve seat 26.

The closing force of the air pressure on the closure member 22 and the restraining force of the units 54 are such that when the closure member engages valve seat 26 the force of the units is overcome to raise the inner casing 30 say ⅛ inch from disc 50 whereby to open openings 52 to permit air to pass from the reservoir within the inner casing 30 to space 32 to blow or transport material through tube 34.

When the blow has taken place, the controls are reversed to raise the closure member 22, when the spring units will ensure that the openings 52 are closed before the closure member 22 actually leaves seat 26.

Since these constructions automatically take care of the sequence of first closing the space 32, then "blowing" and at the end of the blow making sure the air control valve 53 is shut before the space 32 is again opened to atmosphere, the rest of the controls can be clearly defined.

The basic control consists of one four-way air valve (not shown) connected to ports 56 and 58 of the chamber 28. Two air entries 62 (one only being shown) are provided in the casing 20 passing into the interior of the inner casing 30 through a seal 63 to allow the casing 30 to move relatively to the outer casing 20. These entries are connected to the ports 56 and 58 by any suitable means (not shown) such as by internal flexible tubes or by direct porting through a sliding connection into holes drilled in casing 30.

The simplet form of manual control of the above described embodiments will be of the one action variety where the air valve is operated by hand to close the space 30, and is returned to its original position by the use of a known form of adjustable pneumatic timer after, say 10-15 seconds when the blow has taken place.

A fully automatic sequence is equally simple calling only for the addition of a second adjustable pneumatic timer set to hold the closure open for the few seconds necessary to allow the air reservoir within casing 30 to refill.

These three basic components can be accommodated as a 'pack' within the casing 30 or, in a small control cabinet nereby from which only two flexible pipes are needed to the device itself.

The important point is that this automatic sequence is simply achieved by pneumatic means only, so that the apparatus can be portable, used outdoors, even underwater, or installed in explosive and fire-risk areas where electrical power could not be used.

The automatically controlled apparatus can be used as a sludge pump for lowering by eyes 44 to the bottom of a settling tank or sump and to work in that position. The device can also be provided with further eyes (shown dotted) at its other end to allow the apparatus to be pulled down into a bulk of granular and powder materials for use in unloading such materials from for example ships, barges, and ground bunkers where the only access is from above. The apparatus could also be disposed in, or integrated with a bucket 60 for use where smaller quantities of material have to be debagged, weighed out or otherwise manually handled in batches, and then transported to a hopper, mill or mixer some distance away.

Furthermore combinations of the embodiments may be achieved to better suit the application.

I claim:

1. An apparatus for handling flowable material comprising a base providing an annular valve seat, a support plate spaced from the base having inner and outer concentric casings supported thereon, a pneumatically operable annular closure member located in an annular chamber defined between the casings and mounted for movement between a retracted position in which a material inlet provided between said support plate and said base is open and an extended position in which the closure member engages said valve seat to close said inlet, a material outlet tube opening adjacent said base and extending axially away therefrom through the interior of the inner casing, and pneumatic control means for controlling the opening and closing of said inlet by the closure member, and means for directing air under pressure to the space enclosed by the closure member when the closure member is in its extended position to transport material from that space through the outlet tube.

2. Apparatus for handling flowable material comprising a base providing an annular valve seat, legs extending from the base and secured to a support plate spaced from the base, inner and outer concentric casings supported on said support plate, a pneumatically operable annular closure member located in an annular chamber defined between the casings and mounted for movement between a retracted position in which a material inlet provided between said support plate and said base is open and an extended position in which the closure member engages said valve seat to close said inlet, a material outlet tube opening adjacent said base and extending axially away therefrom through the interior of the inner casing, and pneumatic control means for controlling the opening and closing of said inlet by the closure member, and means for directing air under pressure to the space enclosed by the closure member when the closure member is in its extended position to transport material from that space through the outlet tube.

3. Apparatus according to claim 2 wherein the interior of the inner casing defines an air reservoir, and wherein an air control valve is provided between said reservoir and said space to direct, when opened, air under pressure to said space to effect said material transportation.

4. Apparatus according to claims 3, wherein said air control valve is operable to open automatically in response to the closure member engaging the valve seat.

5. Apparatus according to claim 2, wherein at least one of said casings are mounted for limited movement relative to said support plate, and wherein the force of the closure member engaging the valve seat effects said limited movement to open an air control valve.

6. Apparatus according to claim 5, wherein the air control valve is provided by a resilient layer disposed between the support plate and a wall of the inner casing, wherein said wall has at least one through opening, and wherein at least one of said casings and hence said wall is moved away from the resilient layer during said limited movement to allow air under pressure to pass through said at least one through opening.

7. Apparatus according to claim 6, and including spring biasing means for opposing relative movement of said at least one casing in a valve opening direction.

* * * * *